United States Patent
Hoshina et al.

(10) Patent No.: US 8,128,166 B2
(45) Date of Patent: Mar. 6, 2012

(54) SEAT COVER COVERING STRUCTURE

(75) Inventors: Makoto Hoshina, Toyota (JP);
Kazukimi Shinohara, Nagoya (JP);
Seiji Chaza, Toyoake (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 206 days.

(21) Appl. No.: 12/518,464

(22) PCT Filed: Nov. 27, 2007

(86) PCT No.: PCT/JP2007/072814
§ 371 (c)(1),
(2), (4) Date: Aug. 13, 2009

(87) PCT Pub. No.: WO2008/072465
PCT Pub. Date: Jun. 19, 2008

(65) Prior Publication Data
US 2010/0060069 A1  Mar. 11, 2010

(30) Foreign Application Priority Data
Dec. 11, 2006  (JP) .................................. 2006-333231

(51) Int. Cl.
*A47C 31/00* (2006.01)
(52) U.S. Cl. ............... 297/218.4; 297/218.3; 297/218.5; 297/228.11; 297/228.12
(58) Field of Classification Search ............... 297/218.1, 297/218.2, 218.3, 218.4, 218.5, 228.11, 228.12
See application file for complete search history.

(56) References Cited

U.S. PATENT DOCUMENTS

| 3,747,178 | A  | * | 7/1973  | Harder, Jr. .............. 297/218.4 X |
| 6,592,181 | B2 | * | 7/2003  | Stiller et al. ........... 297/218.2 X |
| 7,296,852 | B2 | * | 11/2007 | Huse ........................ 297/228.11 |

(Continued)

FOREIGN PATENT DOCUMENTS

DE  10120621  11/2002

(Continued)

OTHER PUBLICATIONS

English language Abstract of JP 2004-337, Jan. 8, 2004.

(Continued)

*Primary Examiner* — Anthony D Barfield
(74) *Attorney, Agent, or Firm* — Greenblum & Bernstein, P.L.C.

(57) ABSTRACT

A pull-in recess is formed in a seat pad (30). The pull-in recess is partly formed as a through hole penetrating to a back surface of the seat pad. A seat cover (40) is formed into a bag shape. A string-shaped member (50) for drawing the seat cover (40) and attaching the same to the seat pad (30) is disposed along an opening of the seat cover. The seat cover (40) is provided with a pull-in portion at a position corresponding to the pull-in recess of the seat pad (30). The pull-in portion is inserted into the through hole of the seat pad (30). A distal end of the pull-in portion is provided with a retainer portion (47a and 47b) that is capable of engaging the string-shaped member (50). The retainer portions (47a and 47b) inserted into the through holes (34a and 34b) of the seat pad (30) are engaged with the string-shaped member (50) while the drawing action force of the string-shaped member (50) is applied thereto, which force can be produced when the seat cover is attached by drawing.

12 Claims, 17 Drawing Sheets

U.S. PATENT DOCUMENTS 7,946,649 B2 * 5/2011 Galbreath et al. ......... 297/218.1
2009/0121530 A1 5/2009 Yasuda et al.

FOREIGN PATENT DOCUMENTS

| FR | 2836906 | 9/2003 |
| --- | --- | --- |
| JP | 58-39152 U | 3/1983 |
| JP | 62-70899 U | 5/1987 |
| JP | 62-111500 U | 7/1987 |
| JP | 5-13300 U | 2/1993 |
| JP | 2004-337 A | 1/2004 |
| JP | 2004-8488 A | 1/2004 |

OTHER PUBLICATIONS

English language Abstract of JP 2004-8488, Jan. 15, 2004.

* cited by examiner

SEAT COVER COVERING STRUCTURE

TECHNICAL FIELD

The present invention relates to a seat cover covering structure. More particularly, the present invention relates to a seat cover covering structure of a seat, in which an outer surface of a seat pad is covered by a bag-shaped seat cover and in which the seat cover is attached to the seat pad by drawing an opening thereof using a string-shaped member while at least a part of the seat cover is pulled into the seat pad.

BACKGROUND ART

Conventionally, as a seat cover (a surface covering member) for covering a seat surface of a vehicle such as an automobile, a so-called drawing type seat cover is taught by, for example, Japanese Laid-open Utility Model Publication No. 62-111500. The seat cover has a bag-shape and is applied to the surface of a seat pad (a cushion body), so as to covers the surface of the seat pad by narrowing an opening thereof at a back surface side of the seat pad.

Incidentally, for the purpose of improving a sitting comfort of a passenger sitting on a seat or increasing appearance of the seat, it is necessary to attach the seat cover while the seat cover follows a surface profile of the seat pad.

According to Japanese Laid-open Utility Model Publication No. 62-111500, a hook-and-loop fasteners is disposed on a corresponding position of a back surface of the seat cover and a front surface of the seat pad. The seat cover closely contacts the front surface of the seat pad by fastening the hook-and-loop fastener, so as to follow the surface profile thereof.

In another method, a recess is formed in a slightly depressed central portion of a seat pad such that a seat cover can be pulled into the recess. The seat cover is pulled into the recess formed in the seat pad and is fixed thereto. As a result, the seat cover can follow a surface profile of the seat pad. This is a so-called pull-in structure.

As shown in FIG. 25, for instance, Japanese Laid-open Patent Publication No. 2004-337 discloses a seat 100 in which a seat cover is attached to a slightly depressed surface portion 102 that is positioned at a central position of a seat cushion 110 on which a passenger sits. In the seat, the seat cover is attached to the seat pad by a pull-in structure, so as to follow a surface profile of the seat pad. As shown in FIG. 26, in the pull-in structure, an insert wire 112 is previously disposed in a recess 111a formed in a central position of a seat pad 111. Conversely, a pull-in cord 113 is sewed on a back surface of a seat cover 115. The pull-in code 113 has a J-shaped hook 113a positioned at a distal end thereof and an insertion hole 113b formed in an upper side thereof. As shown in FIG. 27, the seat cover 115 is positioned in the recess 111a when the J-shaped hook 113a is engaged with the insert wire 112. Thereafter, a C-shaped ring 114 that is separately formed is inserted into the insertion hole 113b and is then crimped while entangling the insert wire 112. Thus, the pull-in cord 113 is connected to the insert wire 112. As a result, the seat cover 115 is pulled into the recess 111a, so that the seat cover 115 is applied to the seat pad 111 while contouring to a surface thereof. That is, as shown in FIG. 25, the seat 100 in which the seat cover follows the recessed surface portion 102 of the seat cushion 110 can be formed.

Further, Japanese Laid-open Patent Publication No. 2004-8488 discloses a pull-in structure having a connecting means that is different from the Japanese Laid-open Patent Publication No. 2004-337. FIG. 28 illustrates a resin hook 120 corresponding to the connecting means shown in Japanese Laid-open Patent Publication No. 2004-8488. The resin hook 120 corresponds to the J-shaped hook 113a and the C-shaped ring 114 of Japanese Patent Application Laid-open No. 2004-337 and is sewed on a back surface of a seat cover at a position corresponding to a recess formed in a central position of a seat pad. The resin hook 120 includes a substantially cylindrical tubular body 124 having an opening 122 formed in a lower side thereof. The tubular body 124 has a pair of spread guide pieces 126a and 126b that are positioned outside of the opening 122 and has return-claw shaped projections 128a and 128b that are positioned inside of the opening 122. An insert wire 130 is guided by the guide pieces 126a and 126b and is fitted to the tubular body 124 while the opening 122 is bent, so as to be prevented from being disengaged therefrom by the projections 128a and 128b. According to the resin hook 120, the seat cover can be more easily connected to the insert wire 130.

DISCLOSURE OF THE INVENTION

Problem to be Solved by the Invention

As described above, in the drawing type seat cover disclosed in Japanese Laid-open Utility Model Publication No. 62-111500, the opening of the seat cover for covering is narrowed at the back surface thereof. Therefore, an action force pulling the sheet cover laterally and longitudinally can be produced on the surface thereof. Further, the seat cover can be easily uplifted and displaced by sitting load. Therefore, it is not substantially possible to provide a useful seat having a seat cover that can follow a depressed surface profile of a seat pad.

Conversely, as disclosed in Japanese Laid-open Patent Publication No. 2004-337, it is possible to use the pull-in structure in which the back surface of a seat cover 115 is connected to the insert wire 112 attached to the seat pad 111. In this case, the seat cover cannot be easily uplifted and displaced and the seat cover 115 can follow the depressed surface profile of the seat pad 111. However, when the seat cover 115 is attached to the seat pad 111, a special jig is required in order to crimp the C-shaped ring 114. Thus, an owner or a user of the vehicle such as an automobile cannot easily attach the seat cover to the seat pad. In addition, the seat cover cannot be easily detached from the seat pad.

Japanese Laid-open Patent Publication No. 2004-8488 discloses the connecting means in which an attaching property of the seat cover is improved. However, in the connecting means, the insert wire 130 is prevented from being disengaged in an engagement condition. Therefore, the seat cover cannot be detached unless a special jig is used. As a result, it is difficult to detach the seat cover.

As described above, there has not been the seat having an easy detachability that allows the seat cover to be easily attached to or detached from the seat pad and having a reliable attaching property that allows the seat cover to follow the surface profile of the seat pad such that the seat cover can be prevented from easily uplifted and displaced.

The object to be achieved by the present invention is to reliably attach the seat cover to the seat pad while ensuring an easy detachability of the seat cover and a following property of the surface to the seat pad even when the seat cover is attached to the seat pad using the pull-in structure and the drawing structure in order to form the seat in which the seat pad is covered by the seat cover. This object is accomplished by constructing such that pull-in action of the pull-in structure can be performed using a drawing action force of the drawing structure.

Means for Solving the Problems

In a first aspect of the present invention, a seat cover covering structure of a seat in which an outer surface of a seat pad having a pull-in recess is covered by a bag-shaped seat cover and in which an opening of the seat cover is fastened via a drawing structure using a string-shaped member may include a pull-in member provided to a back surface of the seat cover at a position corresponding to the pull-in recess. An action force for narrowing the opening that is produced by tightening the string-shaped member is acted on the pull-in member, so that the seat cover can be pulled into the pull-in recess while the opening is narrowed.

According to the first aspect, the pull-in member provided at the corresponding position on the back surface of the seat cover is pulled into the pull-in recess of the seat pad. Therefore, the seat cover can reliably follow the outer surface of the seat pad. In addition, when the seat cover is attached via the drawing structure, the action force for narrowing the opening that is produced by tightening the string-shaped member can be acted on the pull-in member. As a result, narrowing operation of the opening and pull-in operation into the pull-in recess can be simultaneously performed. Thus, attaching operation and detaching operation of the seat cover can be easily performed. In addition, the seat cover can be reliably attached to the seat pad.

In one embodiment, preferably, at least one portion of the pull-in recess is formed as a through hole penetrating to a back surface of the seat pad. The pull-in member is provided with a pull-in portion that is inserted into the through hole penetrating to the back surface of the seat pad, the pull-in portion being provided integrally or a separate piece. A distal end of the pull-in portion inserted into the through hole is provided with a retainer portion that is capable of engaging the string-shaped member. The retainer portion of the pull-in portion of the seat cover inserted into the through hole penetrating to the back surface of the seat pad is engaged with the string-shaped member such that the action force for narrowing the opening that is produced by tightening the string-shaped member can be applied thereto.

In this case, the seat cover is placed on the seat pad and is attached thereto by tightening the opening thereof. Therefore, the attaching operation of the seat cover can be easily performed. Further, a pull-in condition in which the seat cover is pulled into the seat pad can be easily obtained without using a special jig or other such tools. That is, the pull-in condition can be easily obtained by simply inserting the pull-in portion into the through hole of the seat pad and by engaging the retainer portion formed in the distal end of the pull-in portion with the string-shaped member. Therefore, the narrowing operation of the opening of the seat cover and the pull-in operation of the seat cover into the pull-in recess can be simultaneously and easily performed. In addition, when the seat cover is detached, the opening can be opened by loosening the action force that is produced by tightening the string-shaped member. At the same time, the pull-in condition can be released. Therefore, the seat cover can be easily detached.

In another embodiment, preferably, both leading sections of the string-shaped member that is disposed along the opening of the bag-shaped seat cover are engaged with the retainer portion of the pull-in portion of the seat cover. Both leading end portions of the string-shaped member are fixed to another construction element such that the action force can be applied to the pull-in portion in a direction along the through hole.

According to the structure, a pulling force in a pull-in direction can be reliably applied to the pull-in portion. Therefore, the pull-in condition can be easily maintained, so that the seat cover can be prevented from easily displacing.

In the other embodiment, preferably, the seat is constructed to be placed on a pedestal member that is position in a back side position. The pedestal member is used as the another construction element to which the leading end portions of the string-shaped member is fixed.

According to the structure, the leading end portions of the string-shaped member can be fixed the pedestal member on which the seat is placed. Therefore, when the opening of the seat cover is narrowed by the string-shaped member, the pull-in operation of the seat cover can be simultaneously performed. In addition, the seat cover can be fixed to the pedestal member on which the seat is placed.

Effects of the Invention

According to the present invention, pull-in action of the pull-in structure can be performed using the action force for narrowing the opening that is produced by tightening the string-shaped member. Therefore, the seat cover can be reliably attached to the seat pad while ensuring the easy detachability of the seat cover and a following property of the surface to the seat pad even when the seat cover is attached to the seat pad using the pull-in structure and the drawing structure in order to form the seat in which the seat pad is covered by the seat cover.

BEST MODE FOR CARRYING OUT THE INVENTION

Figure 1:
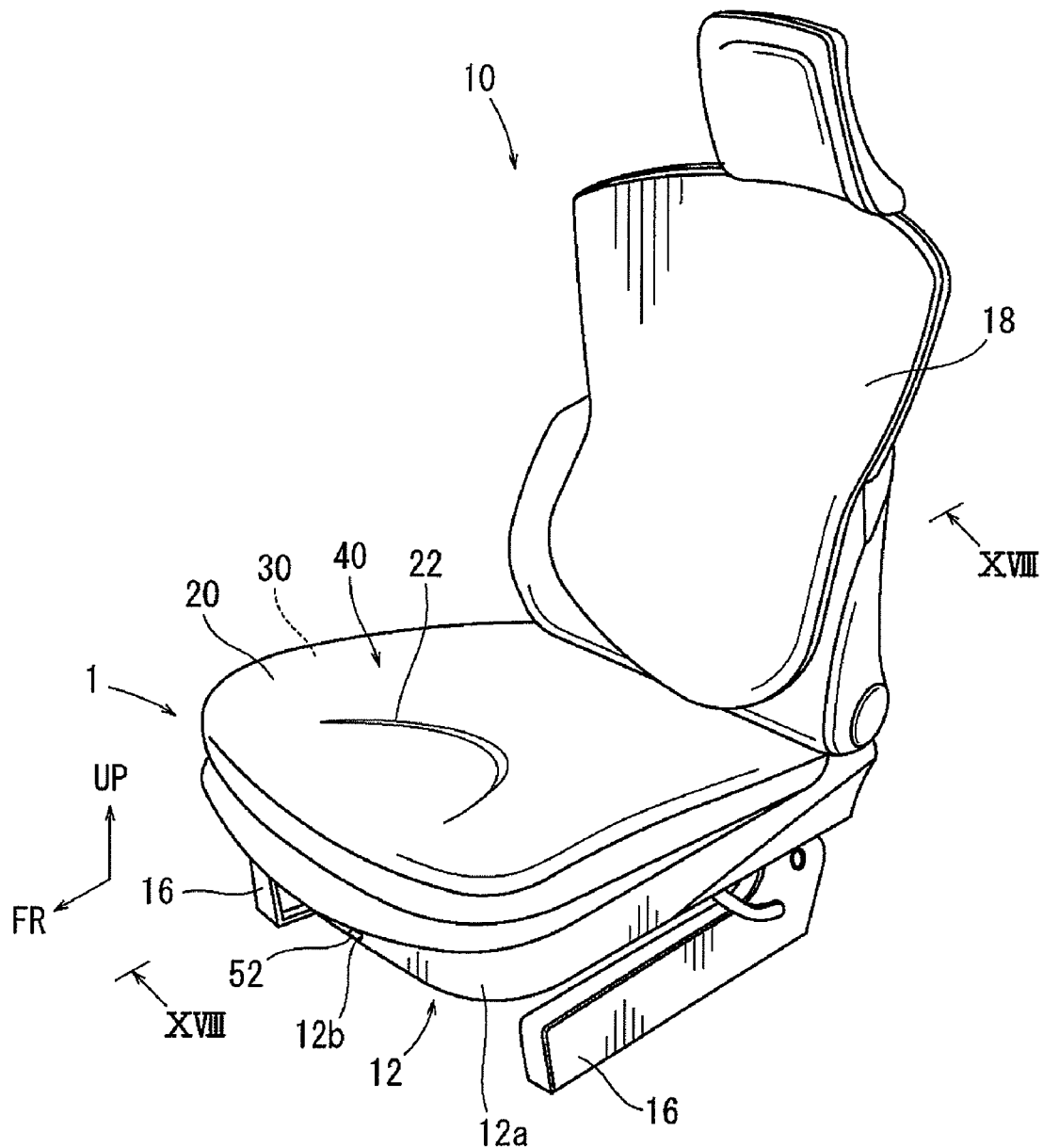
FIG. 1 is a perspective view of a seat of a vehicle having a seat cover covering structure according to a first embodiment.

The preferred embodiments of the present invention will be described in detail with reference to the drawings. The present embodiment (a first embodiment) is an example in which a seat cover covering structure 1 according to the present invention is applied to a seat cushion 2 that constitutes a seating face of a seat 10 of a vehicle shown in FIG. 1. Further, the seat 10 of the vehicle is especially suitable for a seat of an automobile. In the drawings, terms FR and UP respectively represent forward and upward of the vehicle.

Figure 2:
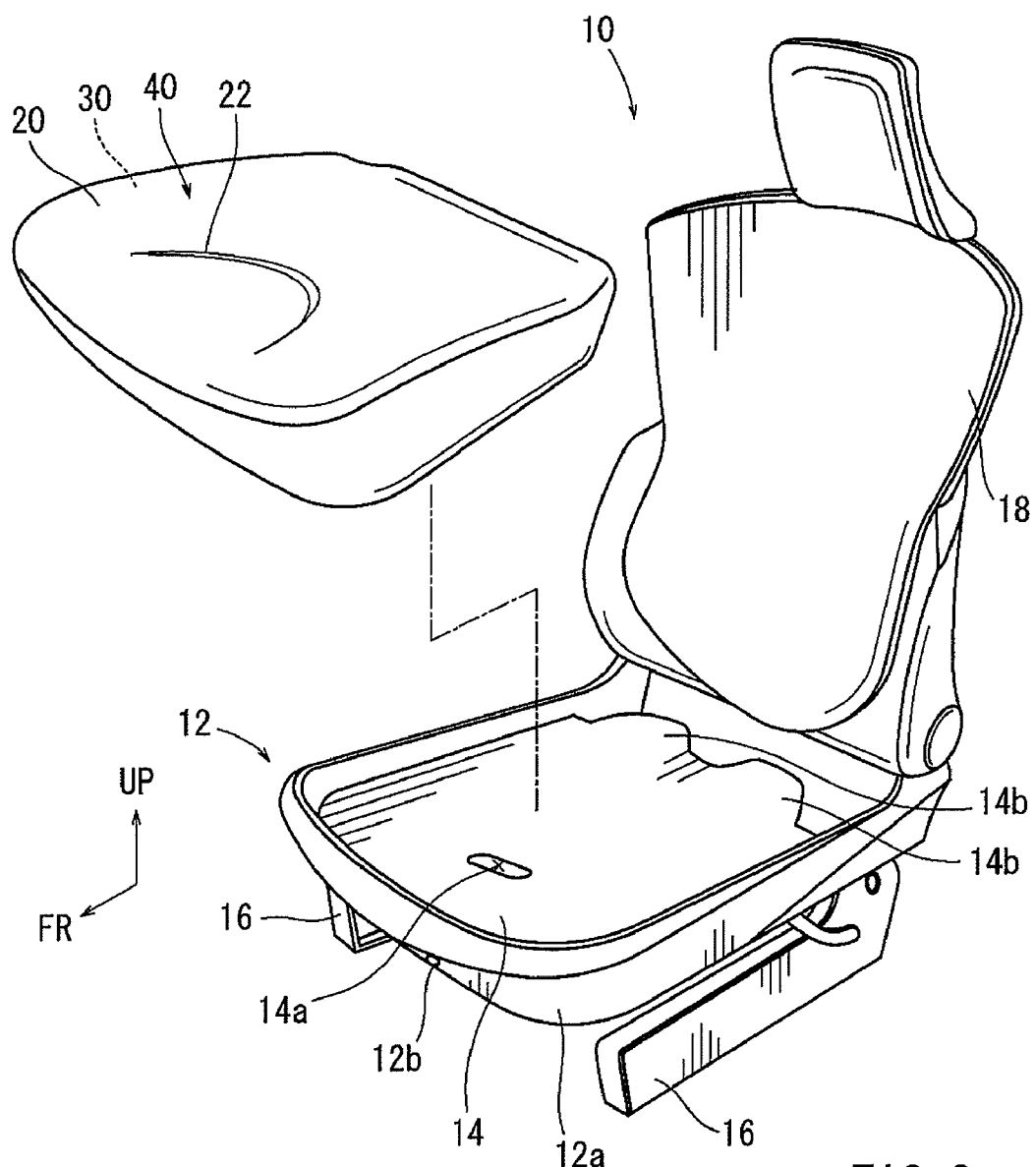
FIG. 2 is an exploded perspective view of the seat of the vehicle shown in FIG. 1.

The seat 10 of the vehicle is constructed of a seat cushion 20 that functions as the seating face and a seat back 18 that functions as a backrest. In view of sitting comfort, a central portion of the seating face of the seat cushion 20 normally is formed into a shape 22 slightly depressed relative to side portions thereof, so as to be lower than the side portions. As shown in FIG. 2, the seat cushion 20 is detachably placed on a bottomed pedestal member 12. The seat cushion 20 is constructed of a seat pad 30 and a seat cover 40 that covers the seat pad 30. An outer surface of the seat pad 30 defines an actual outer shape of the seat cushion 20, and a central position thereof is formed into the shape 22 that is slightly depressed relative to side portions thereof. In order to attach the seat cover 40 to the seat pad 30 while following the depressed shape 22, a pull-in structure is used. In addition, a drawing structure in which an opening of the seat cover 40 is narrowed to refastened is used. Construction elements of the sea-cover covering structure 1 will be described below.

Figure 3:
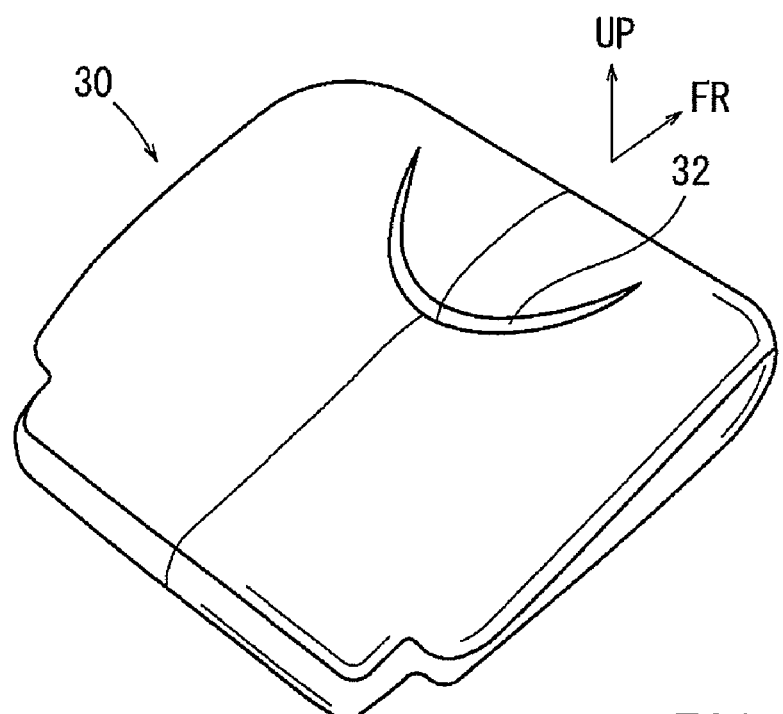
FIG. 3 is a perspective view illustrating an outer surface of a seat pad according to the present embodiment.
Figure 4:
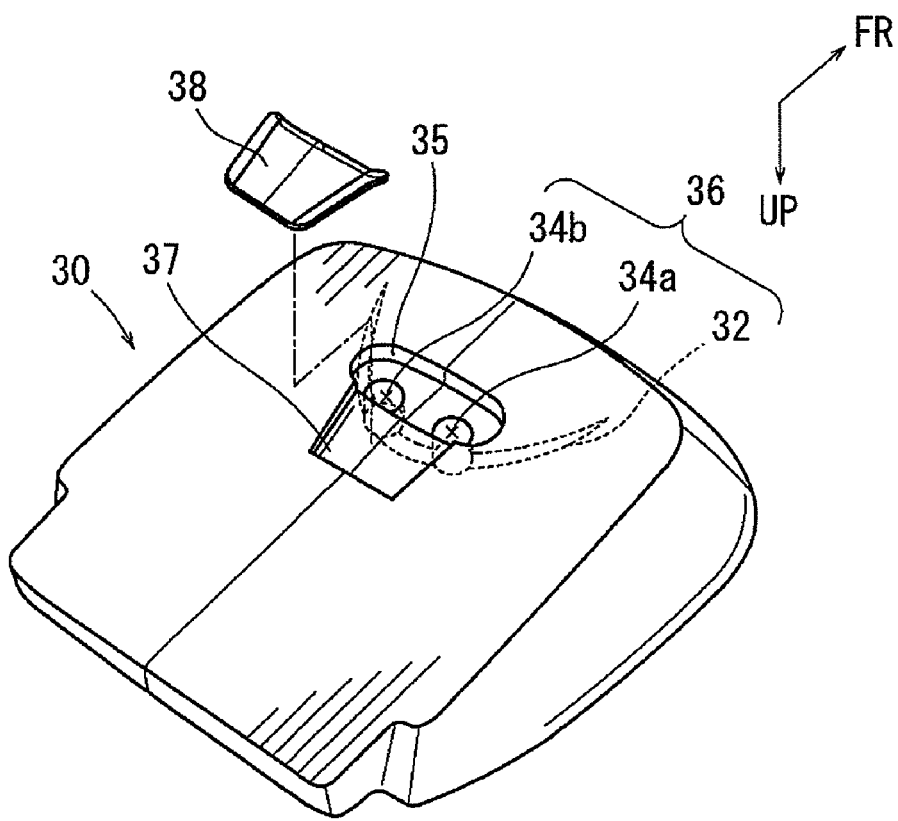
FIG. 4 is a perspective view illustrating a back surface of the seat pad shown in FIG. 3.

As shown in FIG. 3 and FIG. 4, the seat pad 30 is made of urethane, and an outer surface shape of an upper surface thereof defines the actual outer shape of the seat cushion 20. In other words, the central position of the outer surface of the seat pad upper surface is formed into the shape 22 that is slightly depressed relative to the side portions. In order to provide the pull-in structure to an area of the depressed shape 22, a pull-in groove 32 having a crescent shape viewed in a plan view of FIG. 3. The pull-in groove 32 is formed as a bottomed groove. As shown in FIG. 4, formed in a groove bottom portion of the pull-in groove 32 are two through holes 34a and 34b that penetrate to a back surface of the seat pad 30. A shallow groove 35 is formed in an area of the back surface of the seat pad, which area is formed with the through holes 34a and 34b. The shallow groove 35 is formed to encompass the through holes 34a and 34b. In the present embodiment, the pull-in groove 32, the through holes 34a and 34b and the shallow groove 35 constitute a pull-in recess 36 of the present invention.

A surface of the seat pad 30 is coated with a polyurethane coating. Small irregularities are formed on the polyurethane coating by texturing. Such irregularities mainly function to prevent the seat cover 40 and the seat pad from being displaced.

Figure 13:
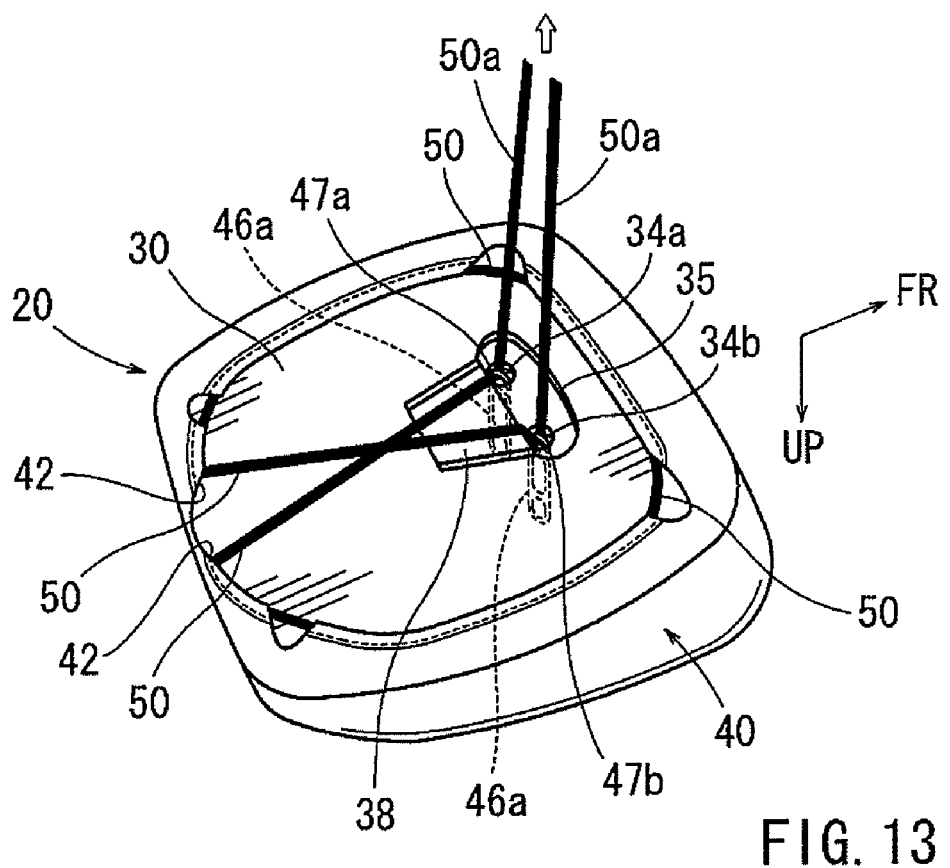
FIG. 13 is a perspective view illustrating the back surface of the seat shown in FIG. 12.

A bite prevention plate fit-in recess is formed in the back surface of the seat pad 30 formed with the through holes 34a and 34b so as to be adjacent to the shallow groove 35. A bite prevention plate 38 is fitted and attached to the recess. The bite prevention plate 38 is made of a hard resin plate and functions to prevent a string-shaped member 50 from biting into the seat pad 30 when the seat cover 40 is drawn, which will be hereinafter described (FIG. 13).

Figure 5:
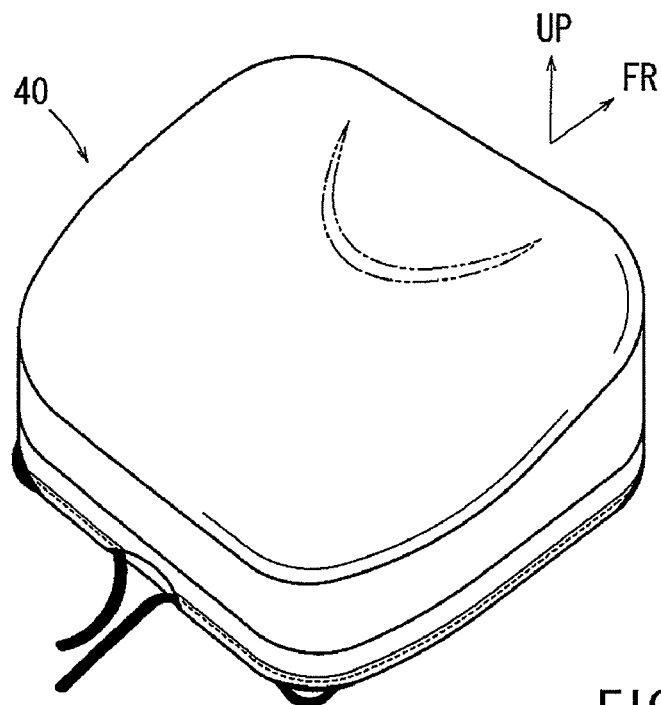
FIG. 5 is a perspective view illustrating an outer surface of a seat cover according to the present embodiment.
Figure 6:
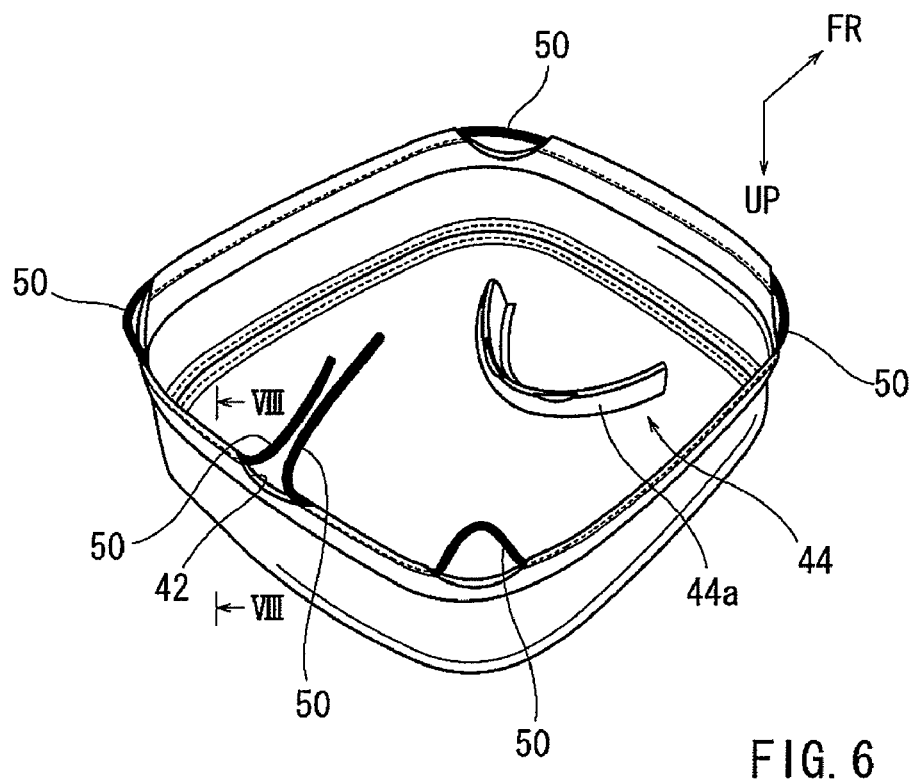
FIG. 6 is a perspective view illustrating a back surface of the seat cover shown in FIG. 5.
Figure 8:
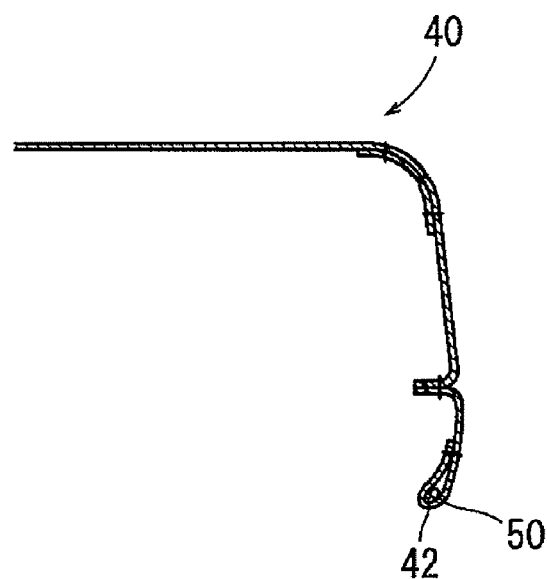
FIG. 8 is a cross-sectional view taken along the line (VIII)-(VIII) of the seat cover shown in FIG. 6.

As shown in FIG. 5 and FIG. 6, the seat cover 40 is formed into a bag-shape that is capable of covering the outer surface of the seat pad 30. An insertion hole 42 is formed in a peripheral edge of the opening of the bag-shaped seat cover. The insertion hole 42 is formed by folding back and sewing down (see FIG. 8), and the string-shaped member 50 is inserted thereinto so as to extend along the opening while both end sections thereof are protruded from a rear side of the seat cover 40. When the both end sections of the string-shaped member 50 are pulled, the opening can be narrowed by drawing.

A pull-in member 44 is integrally provided to an inner surface of the seat cover 40 at a position corresponding to the pull-in recess 36 formed in the seat pad 30. In the present embodiment, the pull-in member 44 is formed as a separate piece and is integrated with the inner surface of the seat cover 40 by sewing.

Figure 7:
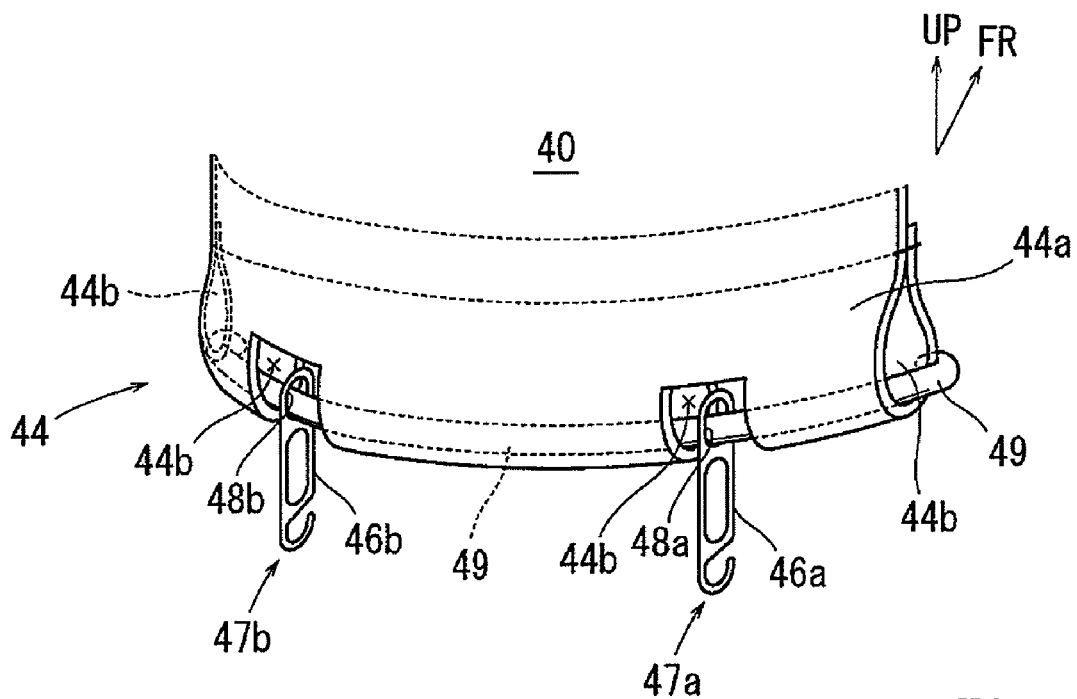
FIG. 7 is a perspective view of a pull-in member of the seat cover shown in FIG. 6.
Figure 15:
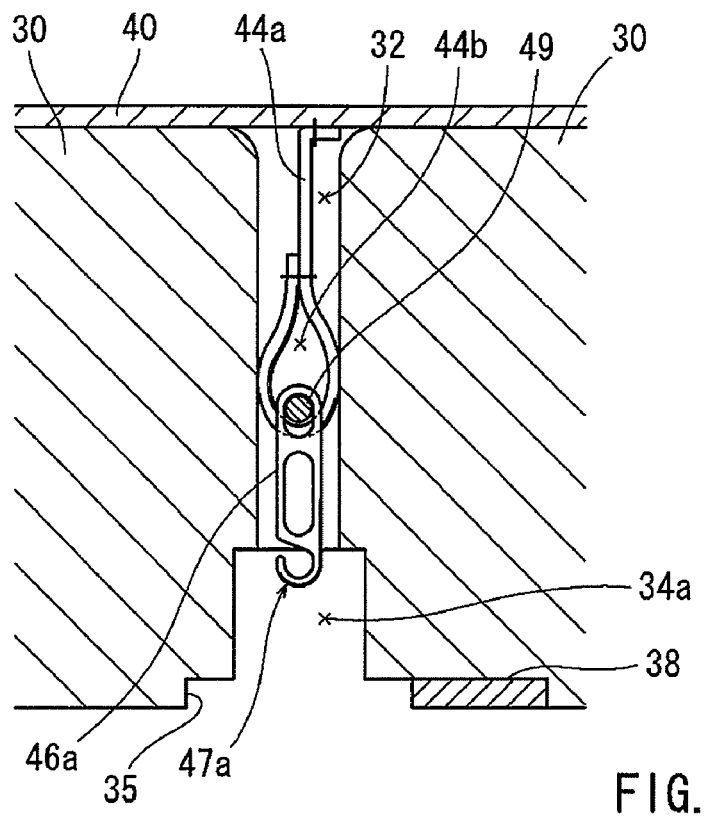
FIG. 15 is a cross-sectional view taken along line (XV)-(XV) of the seat shown in FIG. 10.

As shown in FIG. 7, the pull-in member 44 is formed as a web-like pull-in band 44a of which the upper end is directly sewed to the seat cover 40. Two retainers 46a and 46b are attached to a lower end of the pull-in band 44a. The retainers 46a and 46b are made of resin and has a flat and rectangular shape. The retainers 46a and 46b have hook-shaped retainer portions 47a and 47b formed in lower ends thereof, so that the string-shaped member 50 can be engaged therewith. Further, the retainers 46a and 46b are inserted into the through holes 34a and 34b formed in the seat pad 30 to perform a pull-in function of the seat cover 40 (FIG. 15).

The retainers 46a and 46b are formed as separate pieces that are separated from the pull-in band 44a as the pull-in member 44. The retainers 46a and 46b are attached to the pull-in band 44a via the following attaching structure. That is, attachment holes 48a and 48b are formed in upper ends of the retainers 46a and 46b. Conversely, an insertion hole 44b having two removed portions is formed in the lower end of the pull-in band 44a by sawing. A wire 49 is inserted into the insertion hole 44b so as to extend over the entire width of the pull-in band 44a. The wire 49 is inserted into the attachment holes 48a and 48b of the retainers 46a and 46b, so that the retainers 46a and 46b can be attached to the lower end of the pull-in band 44a while they are suspended from the removed portions of the insertion hole 44b. The retainers 46a and 46b correspond to pull-in portions of the present invention.

Figure 18:
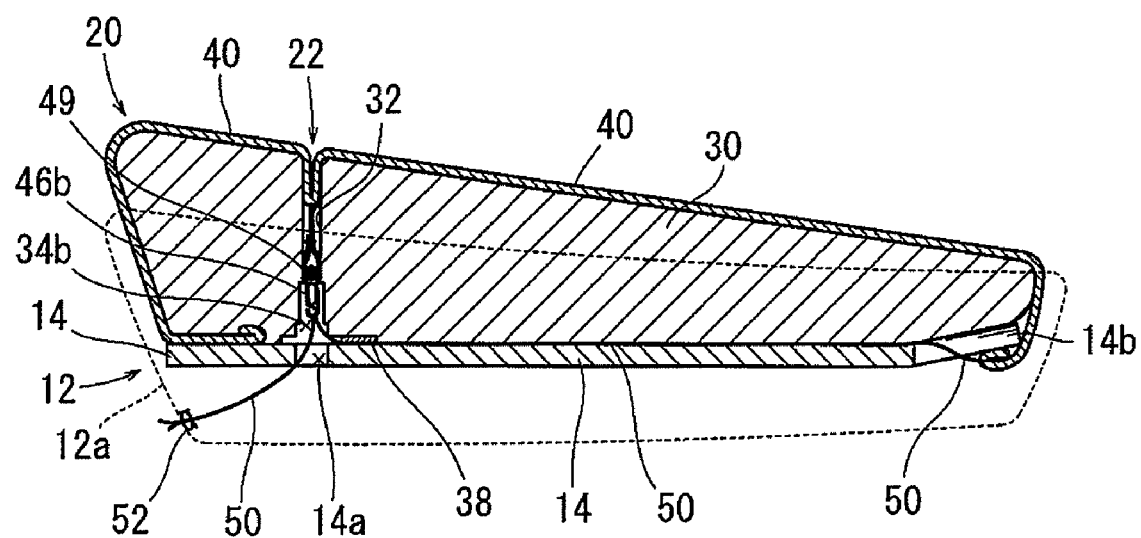
FIG. 18 is a cross-sectional view taken along line (XVIII)-(XVIII) of the seat cover covering structure shown in FIG. 1.

As shown in FIG. 2, the pedestal member 12 on which the seat cushion 20 is placed is fixed to a seat frame 16. The pedestal member 12 has a substantially boat shape that is rearwardly opened and is arranged as a substantially flat placement base 14, so that the seat cushion 20 can be placed in a shield portion 12a while front and side surfaces thereof are covered thereby. Further, the placement base 14 is vertically positioned so as to be raised from a floor surface on which the seat 10 is attached (FIG. 18).

The seat cushion 20 is seated on the pedestal member 12 while it is fitted to the shield portion 12a thereof. A through hole 14a is formed in the placement base 14. The through hole 14a is formed so as to be positioned immediately below the through holes 34a and 34b formed in the seat pad 30 or adjacent thereto when the seat pad 30 is placed, thereby enabling the string-shaped member 50 for drawing to be inserted. Further, a through hole 12b for the string-shaped member 50 is formed in a front portion of the shield portion 12a, so that the string-shaped member 50 passed through the through hole 14a can be inserted thereinto. Two tongue portions 14b are formed in a rear portion of the placement base 14. The tongue portions 14b are formed by partially removing a rear end and are shaped to be gradually curved upwardly.

The seat pad 30 is covered by the seat cover 40, so that the seat cushion 20 can be placed in an assembled condition. The seat cushion 20 in the assembled condition is then placed on the pedestal member 12. A procedure thereof will be described in due order.

Figure 9:
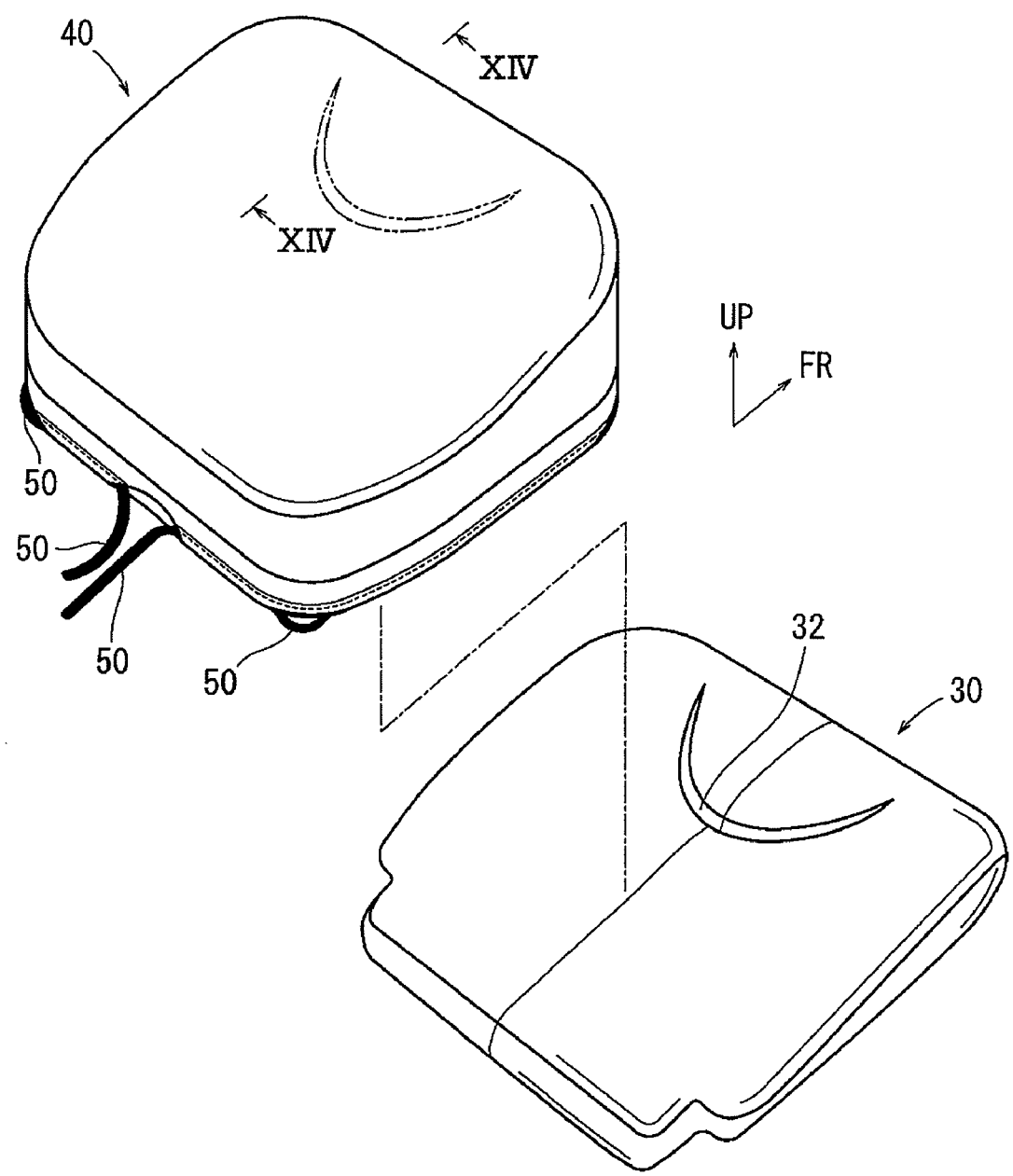
FIG. 9 is an exploded perspective view of the seat according to the present embodiment, which illustrates a condition before the seat pad is attached to the seat cover.
Figure 10:
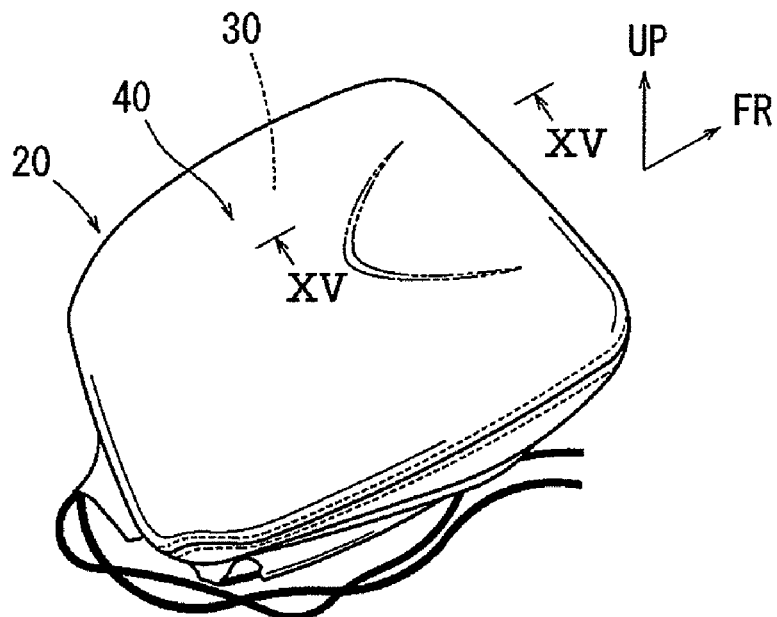
FIG. 10 is a perspective view of an outer surface of the seat according to the present embodiment, which illustrates an intermediate condition in which the seat pad is being attached to the seat cover.
Figure 11:
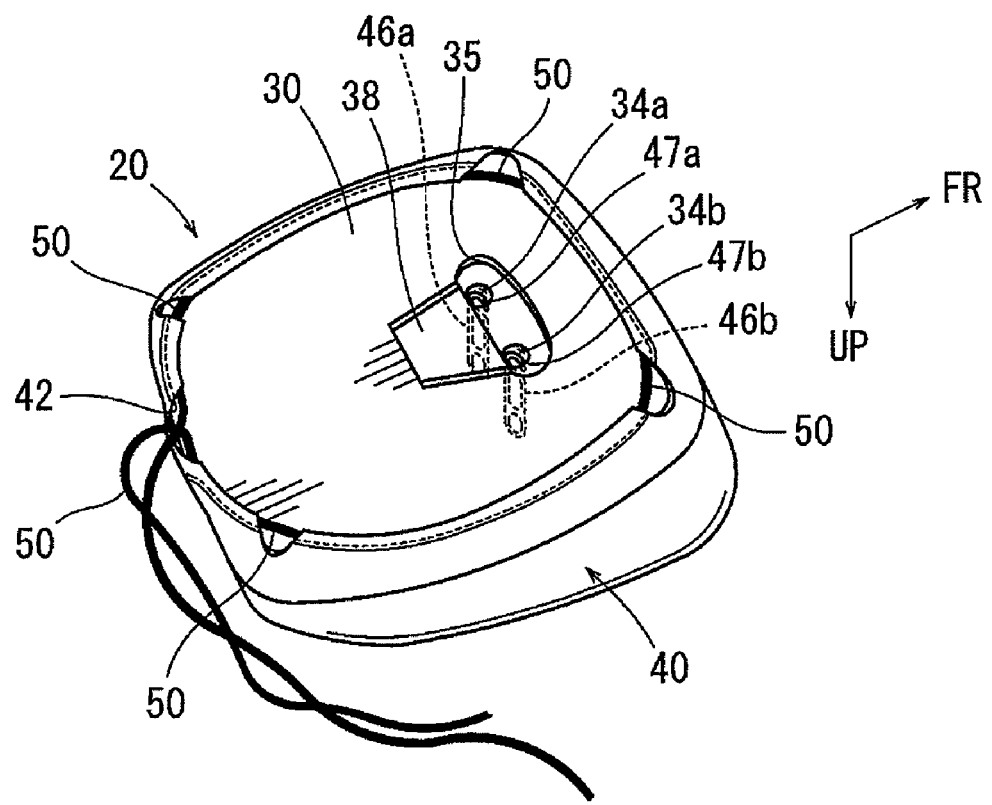
FIG. 11 is a perspective view illustrating a back surface of the seat shown in FIG. 10.
Figure 14:
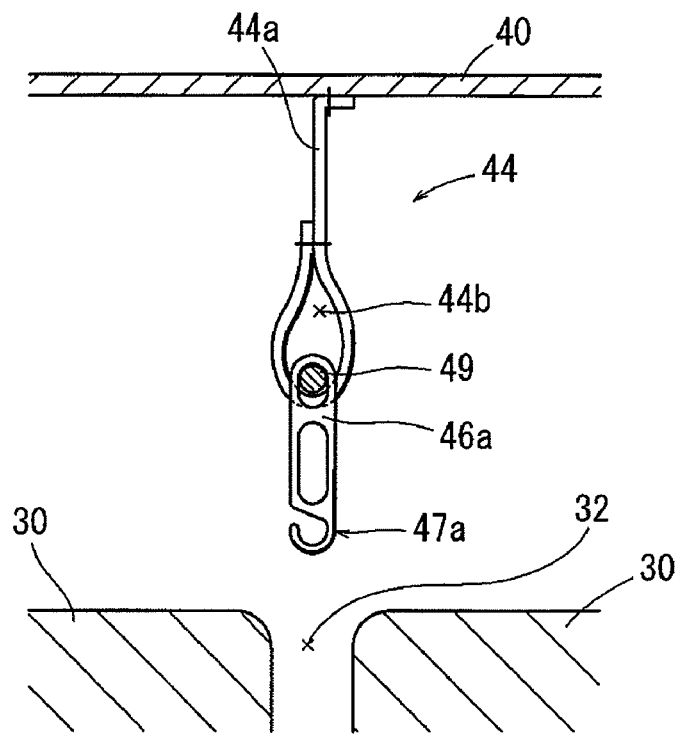
FIG. 14 is a cross-sectional view taken along line (XIV)-(XIV) of the seat shown in FIG. 9.

First, as shown in FIG. 9 and FIG. 14, the bag-shaped seat cover 40 is applied to the seat pad 30 while the pull-in member 44 attached to the seat cover 40 is positioned to correspond to the pull-in recess 36 formed in the seat pad 30. At this time, as shown in FIG. 15, the pull-in band 44a as the pull-in member 44 is suspended in the pull-in groove 32 formed in the seat pad 30, so that the retainers 46a and 46b attached to the lower end of the pull-in band 44a are respectively introduced into the through holes 34a and 34b that are formed to be continuous with the pull-in groove 32. In other words, the seat cover 40 is applied to the seat pad 30 while the pull-in band 44a and the retainers 46a and 46b are suspended in and fitted to the pull-in groove 42 and the through holes 34a and 34b (FIGS. 10 and 11). At this time, although the pull-in member 44 is suspended in the pull-in recess 36, a pull-in action force into the pull-in recess 36 is not applied thereto.

Figure 12:
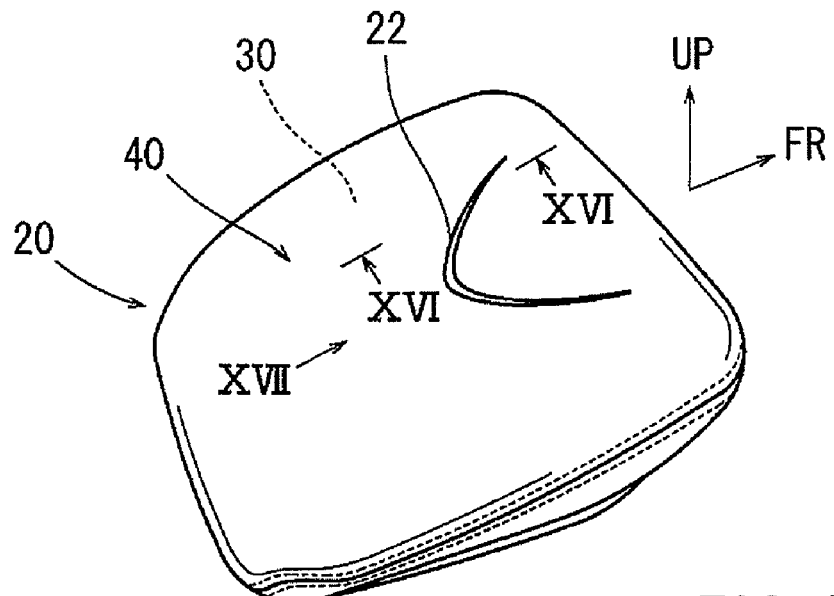
FIG. 12 is a perspective view illustrating the outer surface of the seat according to the present embodiment, which illustrates a condition in which attachment of the seat cover to the seat pad is completed.
Figure 16:
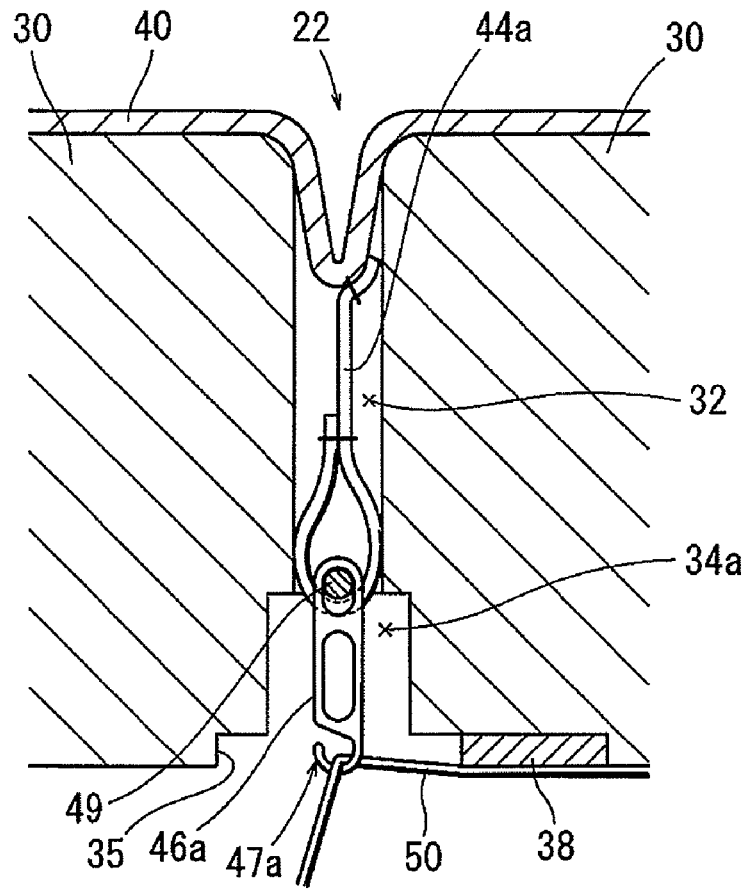
FIG. 16 is a cross-sectional view taken along line (XVI)-(XVI) of the seat shown in FIG. 12.
Figure 17:
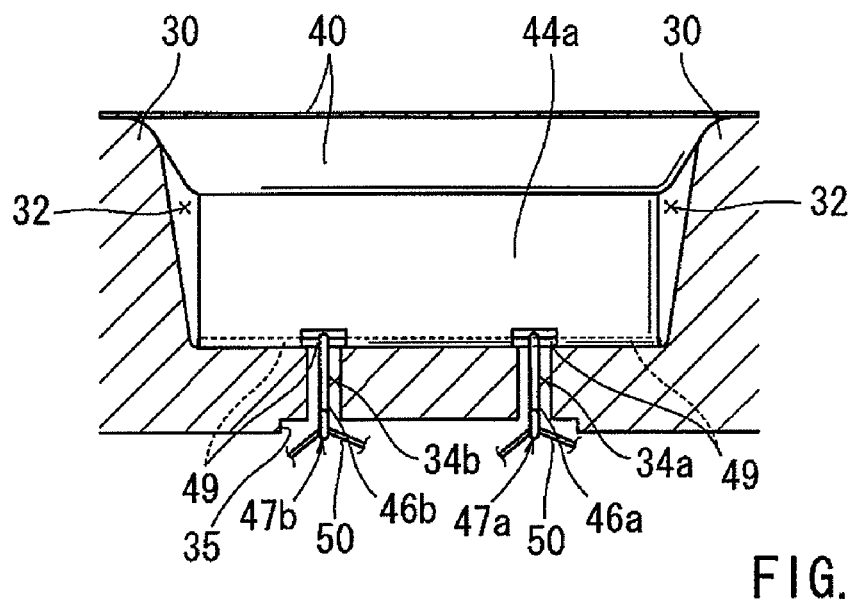
FIG. 17 is a cross-sectional view of a pull-in portion of the seat shown in FIG. 12, which is viewed from a XVII direction.

Next, as shown in FIG. 13, the string-shaped member 50 is crossed outside the insertion hole 42 formed in the seat cover 40 at an intersection point. Thereafter, leading sections of the string-shaped member 50 are engaged with the retainer portions 47a and 47b formed in distal ends of the retainers 46a and 46b suspended in the through holes 34a and 34b at points that are closer to ends of the string-shaped member 50 than the intersection point. Further, the both ends of the string-shaped member 50 are pulled downwardly. Thus, an action force for narrowing the opening, i.e., a drawing action force, is generated on the string-shaped member 50. The action force functions as an action force for applying the seat cover 40 to the seat pad 30 and simultaneously functions as a pull-in action force that enables the seat cover 40 to follow the depressed shape of the outer surface of the seat pad 30. That is, the string-shaped member 50, when pulled at the both ends thereof so as to be in a tensioned condition, may have drawing performance for narrowing the opening of the seat cover 40. As a result, the opening of the bag-shaped seat cover 40 is narrowed, so that the seat cover 40 can be applied to the seat pad 30 while it follows the outer surface thereof. When the drawing performance is produced, the retainers 46a and 46b are pulled downwardly in FIGS. 15 and 16 by the string-shaped member 50 and are moved from a condition of FIG. 15 to a condition of FIG. 16 because the string-shaped member 50 is engaged with the retainer portions 47a and 47b of the retainers 46a and 46b. That is, a downward drawing force can be generated in the retainers 46a and 46b. Thus, the entire pull-in member 44 is pulled into the pull-in recess 36, so that the seat cover 40 is applied to seat pad 30 as a covering condition in which a seat cover portion provided with the pull-in member 44 follows an outer surface profile of the seat pad 30 (FIG. 12). Therefore, even if the outer surface of the seat pad 30 is somewhat depressed, the seat cover can be applied thereto while it reliably follows thereto. Further, as best shown in FIG. 17, pull-in operation of the pull-in member 44 can be carried out until the wire 49 contacts the bottom portion of the pull-in groove 32. In some cases, the pull-in member can be arranged so as to be pulled into the pull-in recess while the seat pad 30 is elastically deformed at the bottom portion of the pull-in groove 32.

Thus, the seat cushion 20 can be placed in the assembled condition in which the seat pad 30 is covered by the seat cover 40. Further, in this condition, the both ends of the string-shaped member 50 can be tied and fixed, so as to terminate covering work of the seat cover. That is, after the both ends 50a and 50a of the string-shaped member 50 shown in FIG. 13 are engaged with the retainer portions 47a and 47b of the retainers 46a and 46b, the both ends can be tied and fixed, thereby terminating the work. In the present embodiment, as described below, the both ends 50a and 50a of the string-shaped member 50 is fixed after the seat cushion 20 is seated on the pedestal member 12.

In order to fix the both ends 50a and 50a of the string-shaped member 50, first, the seat cushion 20 in the assembled condition is placed on the pedestal member 12. Thereafter, as shown in FIG. 18, both leading end portions of the string-shaped member 50 are successively inserted into the through hole 14a of the placement base 14 and the through hole 12b of the shield portion 12a. In this condition, the leading end portions of the string-shaped member 50 are pulled and fixed to the through hole 12b of the shield portion 12a. In the present embodiment, the leading end portions of the string-shaped member 50 is fixed using a fixture member 52 that is made of resin. The fixture member 52 can be positioned at a desired position in a length direction of the string-shaped member 50, so as to clamp the string-shaped member 50. The fixture member 52 can be engaged with the through hole 12b of the shield portion 12a while the string-shaped member 50 is tensed to have the drawing action force, so as to fix the string-shaped member 50. Further, when the seat 20 is placed on the placement base 14, the tongue portions 12b of the placement base 14 are inserted between the seat pad 30 and the seat cover 40 covering the seat pad 30 at a rear position of a back surface of the seat 20. Therefore, as shown in FIG. 18, in the rear position of the back surface of the seat 20, the seat cover 40 covers the seat pad 30 while biting the tongue portion 12b.

According to the seat cover covering structure 1 of the seat cushion 20 thus constructed, the following effects are obtained.

First, the through holes 34a and 34b are formed in the pull-in recess 36 that is formed in the seat pad 30. The through holes 34a and 34b penetrate to the back surface of the seat pad. Further, the pull-in member 44 provided in the seat cover 40 has the retainers 46a and 46b that can be inserted to the through holes 34a and 34b. When the string-shaped member 50 is engaged with the retainer portions 47a and 47b of the retainers 46a and 46b while the string-shaped member 50 is applied with the drawing action force, the seat cover 40 is pulled into an interior of the seat pad 30. Because the seat cover 40 is reliably positioned on the outer surface of the seat pad 30 while it is in a pull-in condition, the seat cover 40 cannot be easily uplifted and displaced. In addition, the seat cover 40 can be applied to the seat pad 30 while following the outer surface profile of the seat pad 30. Further, when the drawing performance is produced, the string-shaped member 50 is passed through the through holes 34a and 34b and is introduced into the through hole 14b of the placement base 14 that is positioned immediately below the through holes 34a and 34b. Therefore, a pulling direction of the retainer portions 47a and 47b of the retainers 44a and 44b corresponds to a penetrating direction of the through holes 34a and 34b. Because the penetrating direction corresponds to a pull-in direction, the pull-in action force is more reliably applied to the pull-in member 44. As a result, the pull-in condition can be easily maintained. Therefore, the seat cover 40 is more unlikely to be displaced.

Next, the seat cover 40 has a bag-shape and is attached to the seat pad 30 by drawing the opening thereof. Therefore, the seat cover 40 can be easily attached to the seat pad 30. Further, in order to obtain the pull-in condition in which the seat cover 40 is pulled into the seat pad 30, a special jig or other such tools is not required. That is, the pull-in condition can be easily obtained by inserting the retainers 46a and 46b into the through holes 34a and 34b of the seat pad 30 and by engaging the retainer portions 47a and 47b with the string-shaped member 50. Moreover, the leading end portions of the string-shaped member 50 are fixed to the pedestal member 12 on which the seat cushion 20 is placed. Therefore, the seat cover 40 can be placed in the pull-in condition via the string-shaped member 50 while the opening thereof is narrowed by the string-shaped member 50. At the same time, the seat cushion 20 can be fixed with respect to the pedestal member 12 by the string-shaped member 50.

Next, the string-shaped member 50 is engaged with the retainer portions 47a and 47b of the retainers 46a and 46b while the drawing action force is applied thereto, which force can be produced when the seat cover 40 is attached by drawing. Therefore, when the opening of the seat cover 40 is narrowed, the seat cover 40 can be simultaneously placed in the pull-in condition. Conversely, when the seat cover 40 is detached, the opening is opened by reducing the drawing action force. At this time, the pull-in condition can be released. Therefore, the seat cover can be easily detached. Thus, the seat cover 40 can be easily attached to and detached from the seat pad by an owner or a user of the vehicle such as automobile. Therefore, the seat cover 40 can be cleaned or replaced with a different patterned seat cover in order to rearrange a vehicle interior.

Further, in the pull-in recess 36 provided to the seat pad 30, only a portion of the pull-in groove 32 is formed to the two through holes 34a and 34b penetrating to the back surface. The retainers 46a and 46b of the seat cover 40 are inserted into the through holes 34a and 34b so as to be projected from the back surface of the seat pad. Thus, the pull-in member 44 can be easily positioned. A remaining portion of the pull-in groove 32 is bottomed. Therefore, the pull-in band 44a is fixed while contacting the bottom portion of the pull-in groove 32. As a result, a pull-in depth of the pull-in band 44a can be maintained constant because it is not pulled into the pull-in groove 32 beyond the bottom portion thereof.

The wire 49 extends over the entire width of the lower end of the pull-in band 44a, so as to function as a frame. Therefore, when the retainer portions 47a and 47b are engaged with the string-shaped member 50, a downward pulling force applied to the retainer portions 47a and 47b can be applied substantially evenly over the entire width of the lower end of the pull-in band 44a. Therefore, the seat cover 40 is resistant to slack. Further, the wire 49 can not only function as the frame, the wire 49 and the retainers 46a and 46b can be easily removed from the pull-in band 44a. Therefore, it is beneficial when the seat cover 40 is detached from the seat pad 30 for cleaning.

The bite prevention plate 38 is fitted to the bite prevention plate fit-in recess 37 that is formed in the back surface of the seat pad 30 formed with the through holes 34a and 34b. In particular, the fit-in recess 37 is positioned on a rear position of the shallow groove 35, i.e., a corner portion that contacts the string-shaped member 50. Therefore, the string-shaped member 50 cannot bite into the seat pad 30, so as to be prevented from slacking. Thus, the downward pulling force applied to the retainer portions 47a and 47b via the string-shaped member 50 cannot be destabilized. As a result, the seat cover 40 can be prevented from being displaced. In addition, the depressed shape of the surface of the seat 20 can be prevented from being shallowed.

Further, because the seat pad 30 is coated with polyurethane, the urethane portion of the seat pad 30 is prevented from being directly irradiated with the ultraviolet. That is, the seat pad made of urethane, when exposed to sunlight, can be degraded as it is susceptible to ultraviolet. In the seat 20 of the present invention, because the seat cover 40 is detachable, the seat pad 30 can be exposed, for example, when the seat cover 40 is detached for cleaning. Even in such case, the seat pad 30 can be prevented from degrading due to the polyurethane coating coated thereon. Further, because the polyurethane coating is textured, friction with the seat cover 40 can be increased. Therefore, the seat cover 40 can be prevented from displacing with respect to the seat pad 30. Further, because the surface of the seat pad 30 is textured, a slight gap is formed between the seat cover 40 and the surface of the seat pad 30, thereby increase airflow therebetween.

Further, the seat pad 30 is placed on the placement base 14 while the tongue portion 12b of the placement base 14 is bitten by the seat cover 40. At this time, the string-shaped member 50 is applied with the drawing action force. Thus, a rear end of the placement base 14 can be covered by the seat cover 30. This may lead to increased appearance. Also, the string-shaped member 50 penetrating through the placement base 14 can function as a fixing means of the rear end of the placement base 14.

Further, the present invention is not limited to the embodiment described above and the invention can be modified without departing the scope thereof.

Figure 19:
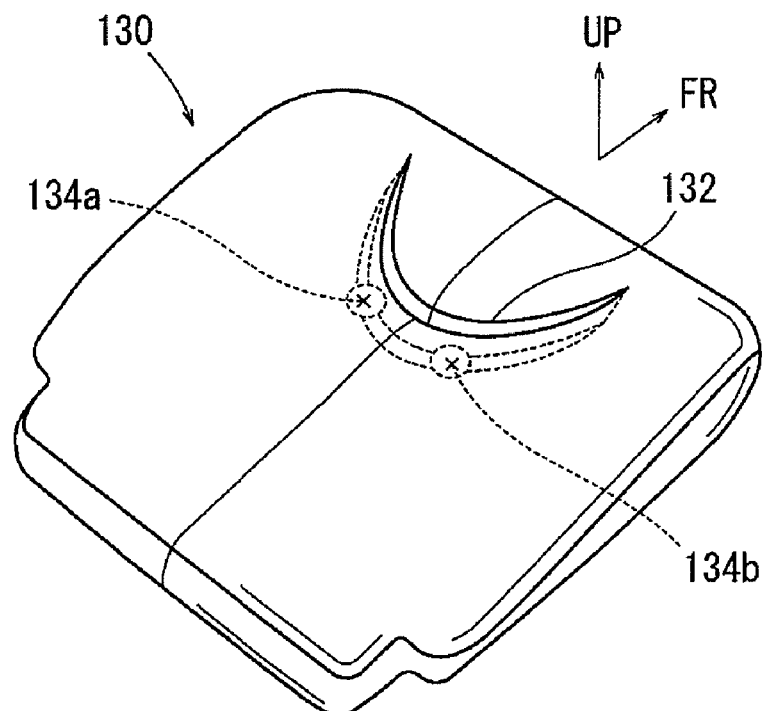
FIG. 19 is a perspective view illustrating an outer surface of a seat pad according to a second embodiment.
Figure 20:
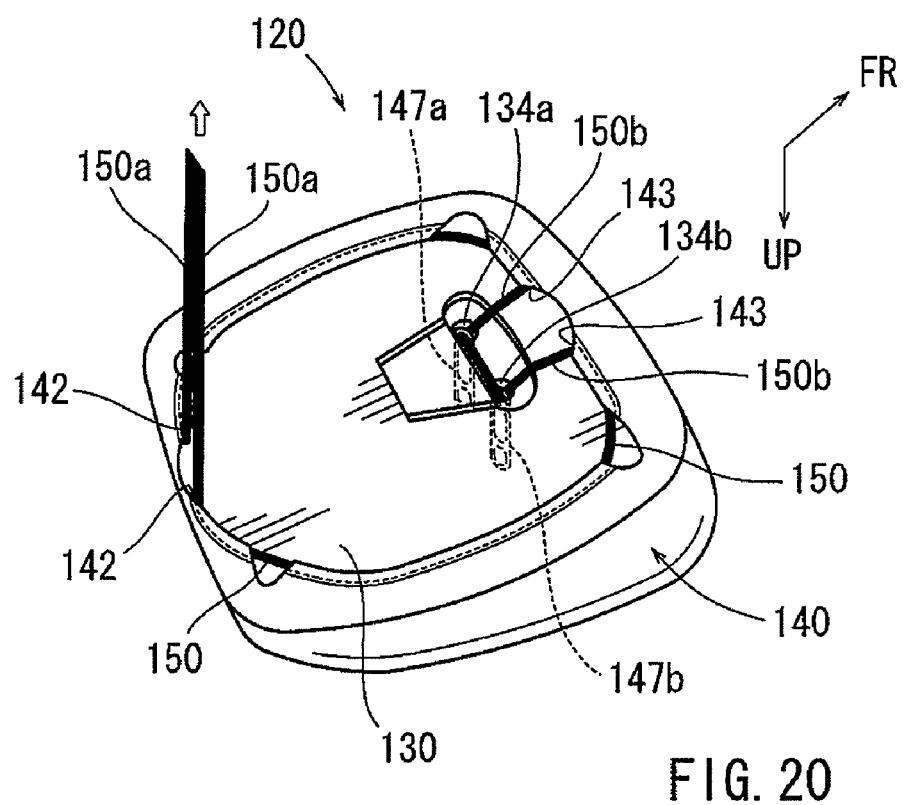
FIG. 20 is a perspective view illustrating a back surface of a seat according to the second embodiment.

The retainer portions of the pull-in portions can be engaged with an intermediate section of the string-shaped member directly corresponding to the opening of the seat cover, and not the leading sections of the string-shaped member, provided that the string-shaped member is applied with the drawing action force when the bag-shaped seat cover is attached by drawing. FIGS. 19 and 20 show an embodiment in which the retainer portions of the pull-in portions are engaged with the intermediate section of the string-shaped member. In this embodiment (a second embodiment), a seat cushion 120 includes a seat pad 130 covered by a seat cover 140. Similar to the seat pad 30 in the above-described embodiment, the seat pad 130 includes a crescent-shaped pull-in groove 132 and through holes 134a and 134b. The through holes 134a and 134b are formed in the pull-in groove 132 and penetrate to a back surface of the seat pad 130. Ends 150a and 150a of a string-shaped member 150 are pulled out from rear side positions (142 in the drawing) of an insertion hole formed in an opening of the seat cover 140 so as to generate the drawing action force. However, the insertion hole is removed at a front side position (143 in the drawing) and an intermediate section 150b of the string-shaped member 150 is pulled out from a removed portion, so that retainer portions 147a and 147b constituting the pull-in portions of the seat cover are engaged therewith.

Further, although it is not shown, a plurality of string-shaped members can be used. However, even when a plurality of string-shaped members are used, the retainer portions should be engaged with least one of the string-shaped members while the string-shaped member is applied with the drawing action force.

Figure 21:
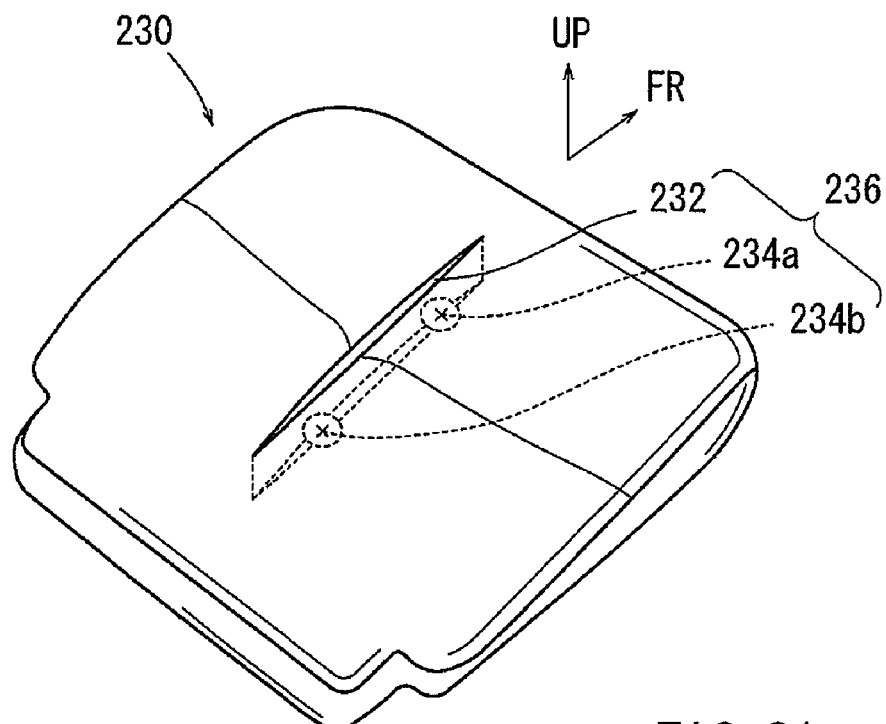
FIG. 21 is a perspective view illustrating an outer surface of a seat pad according to a third embodiment.
Figure 22:
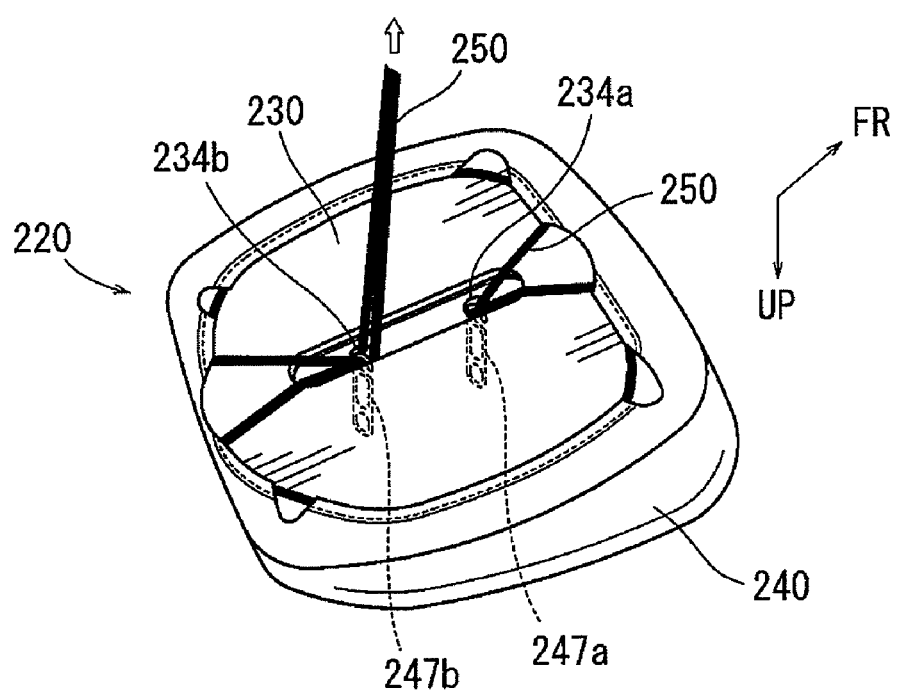
FIG. 22 is a perspective view illustrating a back surface of a seat according to the third embodiment.

In an example of the embodiment described above, the pull-in recess has a crescent shape in plan view and is positioned at an area on the outer surface of the seat pad. However, the shape of the pull-in recess in plan view is not limited to the crescent shape. That is, the pull-in recess can have various shapes such as a linear-shape, a curved-shape and a dotted shape such that the seat can have various surface appearance. FIGS. 21 and 22 show an embodiment in which the pull-in recess has the linear shape. In this embodiment (a third embodiment), a seat cushion 220 includes a seat pad 230 covered by a seat cover 240. The seat pad 230 includes a pull-in recess 236 composed of a linear-shaped pull-in groove 232 that is centrally longitudinally formed therein, and through holes 234a and 234b. The through holes 234a and 234b are formed in the pull-in groove 232 and penetrate to a back surface of the seat pad 230. Although it is not shown, a pull-in member is provided to the seat cover 240 at a position corresponding to the pull-in recess 236 formed in the seat pad 230. Retainers 247a and 247b as the pull-in portions provided to the pull-in member are respectively inserted into the through holes 234a and 234b. Further, the forwardly-positioned retainer 247a is engaged with an intermediate section 250b of the string-shaped member 250 while the string-shaped member is applied with the drawing action force. Conversely, the rearwardly-positioned retainer 247b is engaged with sections including ends 250a of the string-shaped member 250 pulled out from a rear side portion of the seat cover while the string-shaped member is applied with the drawing action force.

Figure 23:
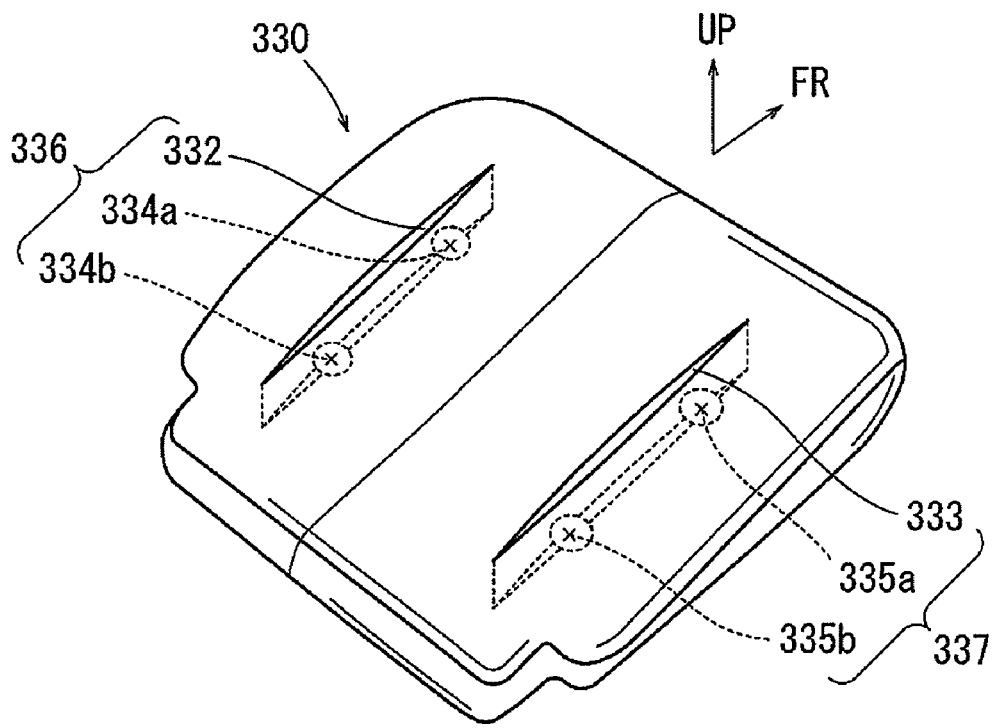
FIG. 23 is a perspective view illustrating an outer surface of a seat pad according to a fourth embodiment.
Figure 24:
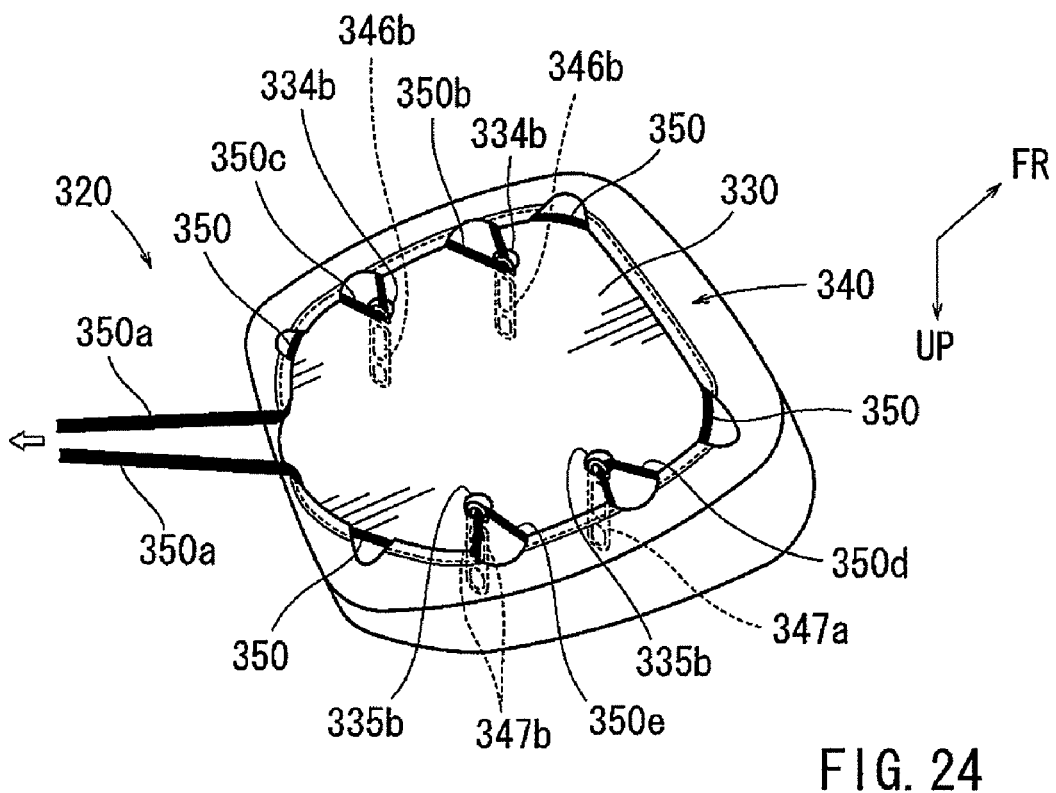
FIG. 24 is a perspective view illustrating a back surface of a seat according to the fourth embodiment.
Figure 25:
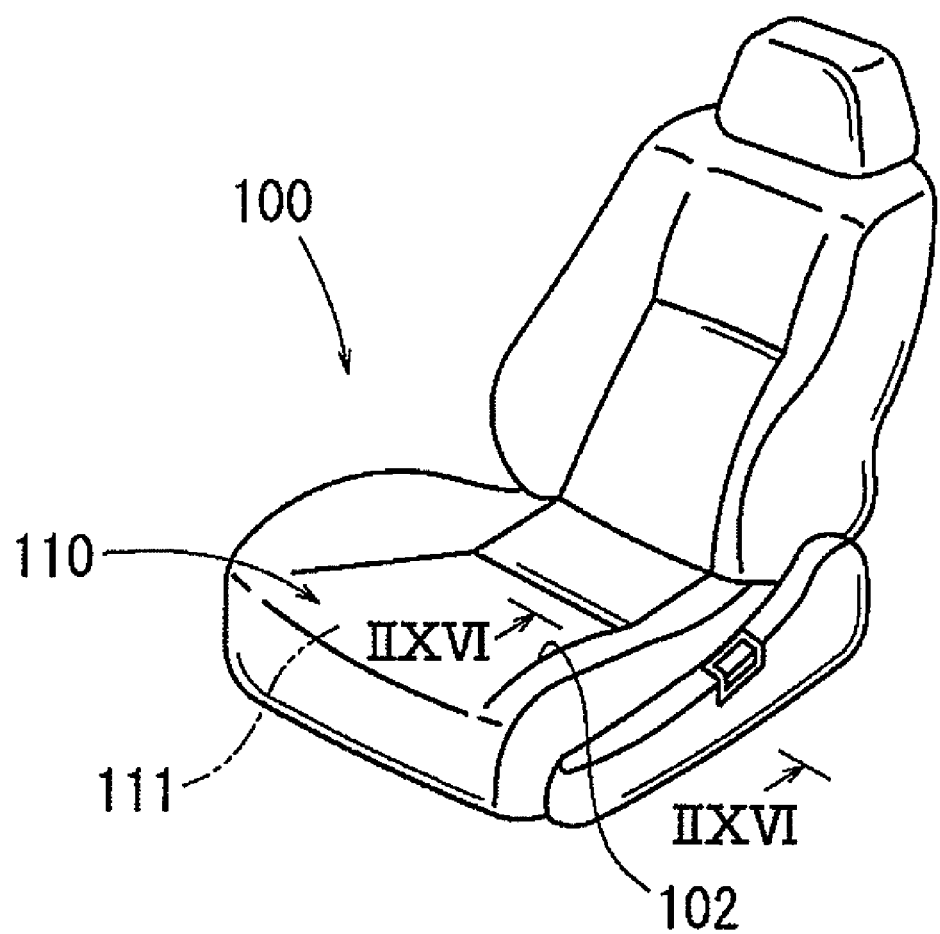
FIG. 25 is a perspective view of a conventional seat.
Figure 26:
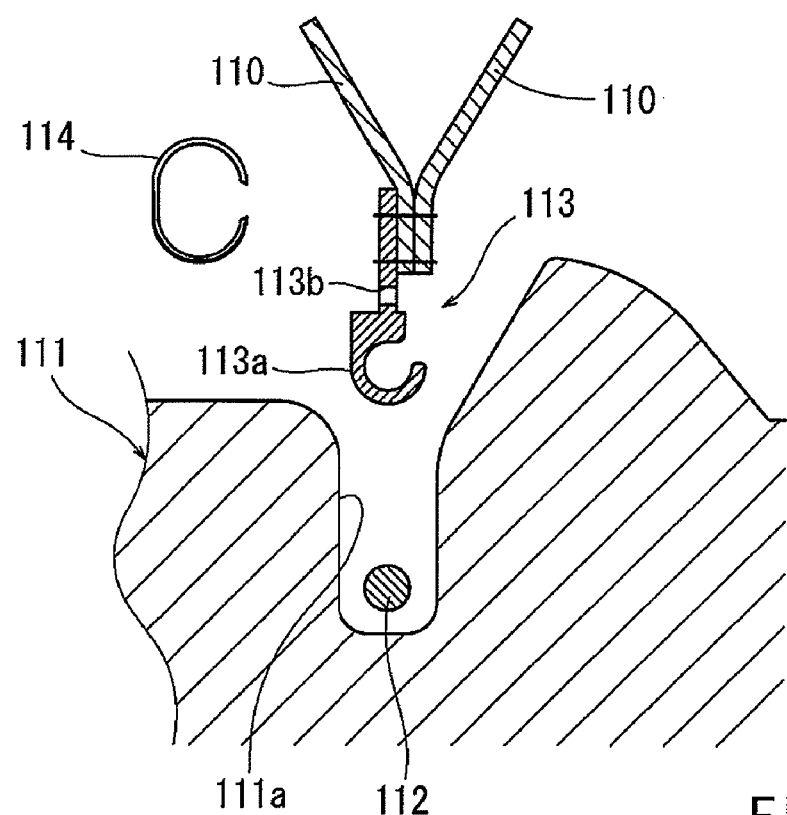
FIG. 26 is a cross-sectional view taken along line (IIXVI)-(IIXVI) of the seat shown in FIG. 25, which illustrates a condition before a seat pad is covered by a seat cover.
Figure 27:
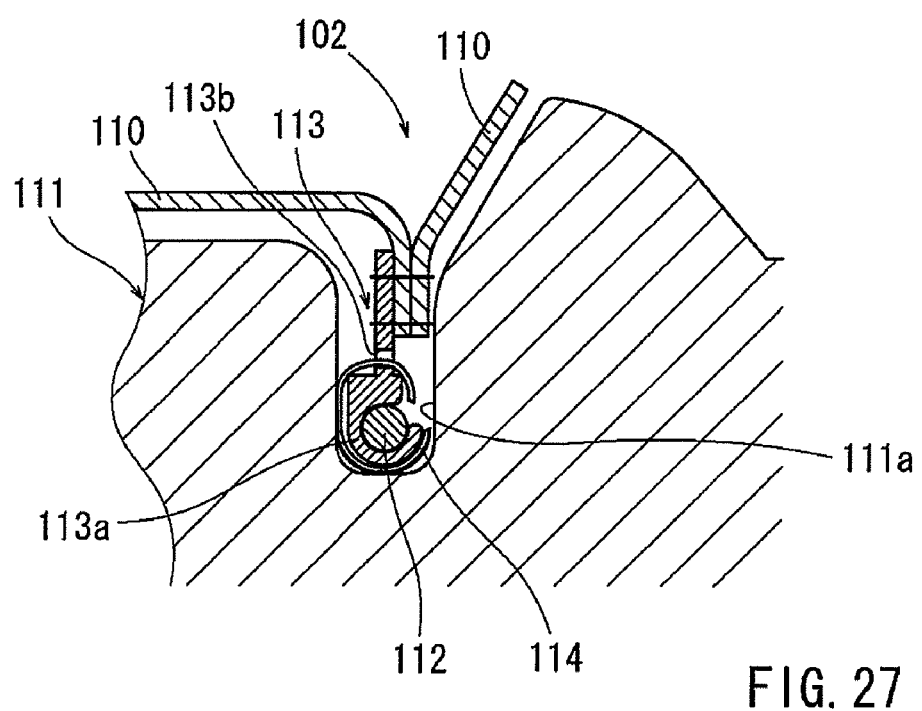
FIG. 27 is a view illustrating a condition in which the seat pad is covered by the seat cover in the seat shown in FIG. 26.
Figure 28:
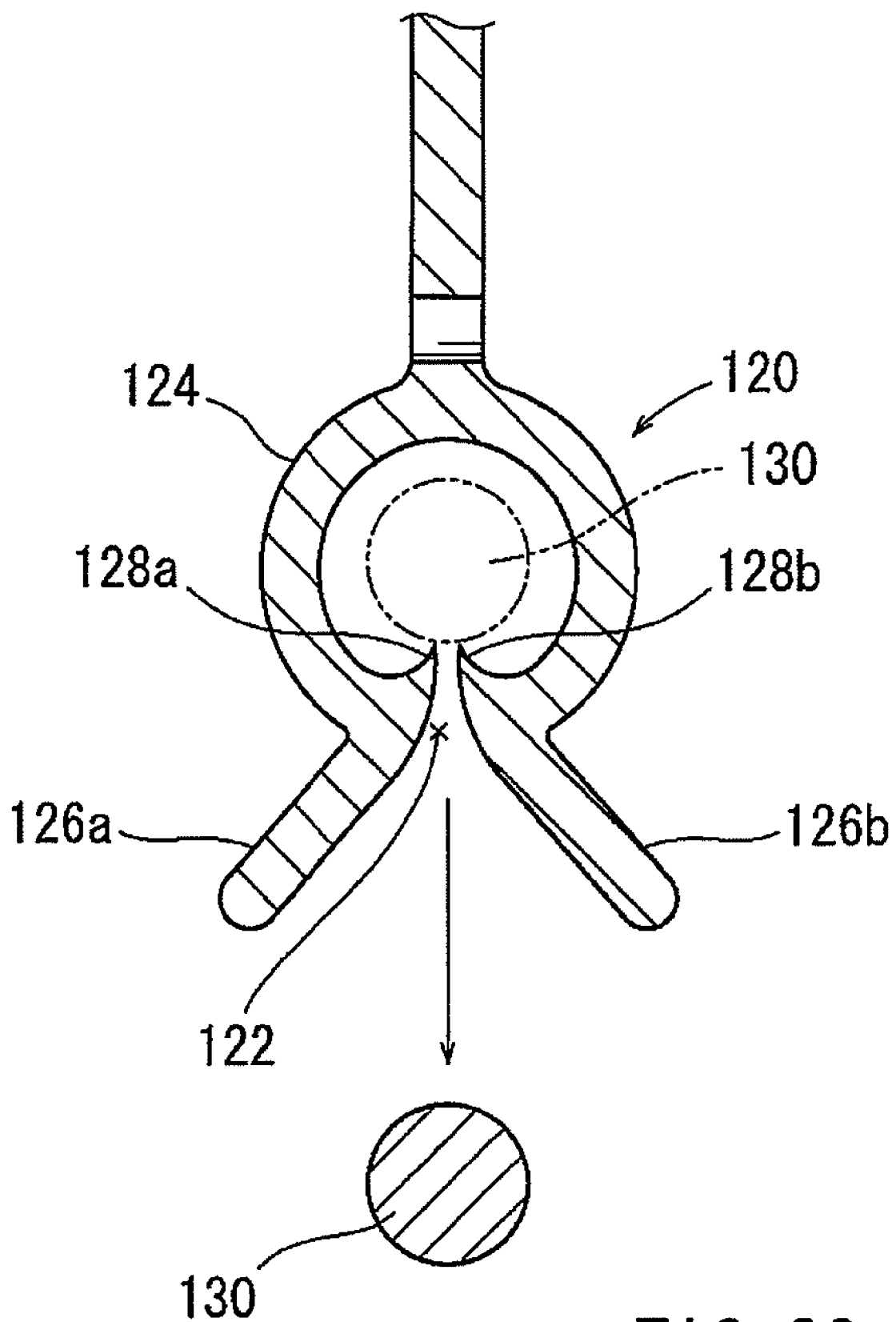
FIG. 28 is a cross-sectional view of another conventional seat, which is taken in a direction perpendicular to an axial direction of an engagement means that functions to engage a back surface of the seat cover to an insert wire.

Further, a plurality of pull-in recesses may be provided at a plurality of areas on the outer surface of the seat pad. FIGS. 23 and 24 show an embodiment in which a plurality of pull-in recesses are provided at a plurality of areas. In this embodiment (a fourth embodiment), a seat cushion 320 includes a seat pad 330 covered by a seat cover 340. The seat pad 330 includes linear-shaped pull-in grooves 332 and 333 that are longitudinally formed in both sides thereof. The pull-in grooves 332 and 333 respectively have through holes 334a, 334b, 334a and 335b that penetrate to a back surface of the seat pad 330, thereby forming pull-in recesses 336 and 337. Although it is not shown, pull-in members are provided to the seat cover 340 at positions corresponding to the two pull-in recesses 336 and 337 formed in the seat pad 330. Retainers 346a, 346b, 347a and 347b as the pull-in portions of the pull-in member are respectively inserted into the through holes 334a, 334b, 335a and 335b. Further, the retainers 346a, 346b, 347a and 347b are respectively engaged with intermediate sections 350b to 350e of the string-shaped member 350 pulled out from lateral sides of the seat cover 340. Ends 350a and 350a of the string-shaped member 350 are pulled out from a rear side portion of the seat cover 340 and are tensioned, so as to produce the drawing action force.

Further, the pull-in recess formed in the seat pad can be formed such that at least one portion thereof can penetrate to the back surface of the seat pad. Therefore, the pull-in recess can be formed such that the entire portion of thereof can penetrate to the back surface of the seat pad. Further, when the pull-in recess has the linear shape in plan view, it is beneficial to provide a plurality of through holes. This may lead to easy positioning of the pull-in portions. In addition, the pull-in member can be effectively prevented from laterally displacing.

Further, the pull-in portions formed in the seat cover can be integrally provided to the pull-in member. Also, the pull-in portions can be provided to the pull-in member as separate pieces.

The seat to which the present invention is applied is not limited to the seat cushion. That is, the present invention can be applied to a seat back, a head rest or other such components.

The invention claimed is:

1. A seat cover covering structure of a seat in which an outer surface of a seat pad having a pull-in recess is covered by a bag-shaped seat cover and in which an opening of the seat cover is fastened via a drawer using a string-shaped material, comprising:
   a pull provided to a back surface of the seat cover at a position corresponding to the pull-in recess,
   wherein an action force for narrowing the opening that is produced by tightening the string-shaped material is acted on the pull, so that the seat cover is pulled into the pull-in recess while the opening is narrowed; wherein at least one portion of the pull-in recess is formed as a through hole penetrating to a back surface of the seat pad, wherein the pull is provided with a pull-in portion that is inserted into the through hole penetrating to the back surface of the seat pad, the pull-in portion being one of integrally formed and provided as a separate piece, wherein a distal end of the pull-in portion is inserted into the through hole and provided with a retainer portion that is capable of engaging the string-shaped material; and wherein the retainer portion of the pull-in portion of the seat cover inserted into the through hole penetrating to the back surface of the seat pad is engaged with the string-shaped material such that the action force for narrowing the opening that is produced by tightening the string-shaped material is applied to the pull-in portion via the retainer portion.

2. The seat cover covering structure of the seat as defined in claim 1, wherein two leading sections of the string-shaped material that are disposed along the opening of the bag-shaped seat cover are engaged with the retainer portion of the pull-in portion of the seat cover, and
   wherein two leading end portions of the string-shaped material are fixed to another construction element such that the action force is applied to the pull-in portion in a direction along the through hole.

3. The seat cover covering structure of the seat as defined in claim 2, wherein the seat is constructed to be placed on a pedestal that is positioned in a back side position, and
   wherein the pedestal is used as the another construction element to which the two leading end portions of the string-shaped material are fixed.

4. The seat cover covering structure of the seat as defined in claim 1, wherein the string-shaped material extends about a periphery of the opening of the seat cover.

5. The seat cover covering structure of the seat as defined in claim 4, wherein the string-shaped material is connected to the pull.

6. The seat cover covering structure of the seat as defined in claim 5, wherein a middle portion of the string-shaped material is connected to the pull.

7. The seat cover covering structure of the seat as defined in claim 5, wherein end portions of the string-shaped material are connected to the pull.

8. The seat cover covering structure of the seat as defined in claim 5, wherein the string-shaped material extends through the pull.

9. The seat cover covering structure of the seat as defined in claim 1, wherein the seat cover includes a plurality of pulls provided to the back surface of the seat cover, each of the plurality of pulls are independent from others of the plurality of pulls, and the string-shaped material is continuously connected to each of the plurality of pulls.

10. The seat cover covering structure of the seat as defined in claim 9, wherein the string-shaped material generally extends about a periphery of the opening of the seat cover.

11. The seat cover covering structure of the seat as defined in claim 1, wherein the pull is attached to the back surface of the seat cover via a single point.

12. The seat cover covering structure of the seat as defined in claim 11, wherein the string-shaped material generally extends about a periphery of the opening of the seat cover and is connected to the pull.

* * * * *